(12) United States Patent
Geng et al.

(10) Patent No.: US 8,697,274 B2
(45) Date of Patent: Apr. 15, 2014

(54) LITHIUM ION BATTERY

(75) Inventors: Ji-bing Geng, Dongguan (CN);
Ping-hua Deng, Dongguan (CN); Yu-jin Wang, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 11 days.

(21) Appl. No.: 13/316,962

(22) Filed: Dec. 12, 2011

(65) Prior Publication Data

US 2012/0156553 A1   Jun. 21, 2012

(30) Foreign Application Priority Data

Dec. 20, 2010   (CN) .................. 2010 2 0669355 U

(51) Int. Cl.
*H01M 2/08* (2006.01)
*H01M 10/04* (2006.01)

(52) U.S. Cl.
USPC ........... 429/174; 429/175; 429/176; 429/185; 29/623.2

(58) Field of Classification Search
None
See application file for complete search history.

(56) References Cited

U.S. PATENT DOCUMENTS 8,034,479 B2 * 10/2011 Hong et al. .................. 429/175

FOREIGN PATENT DOCUMENTS

JP   2009-134986   *   6/2009

* cited by examiner

*Primary Examiner* — John S Maples
(74) *Attorney, Agent, or Firm* — Alston & Bird LLP

(57) ABSTRACT

The present invention provides a lithium ion battery including a battery can, a battery cell received in the battery can, electrolyte filled in the battery can, and a battery cover sealing the battery can. The battery can is formed with a flange portion, and the battery cover is formed with a skirt portion corresponding to the flange portion. The skirt portion of the battery cover tightly wraps the flange portion of the battery can, and the skirt portion and the flange portion wrapped in the skirt portion are tightly wound and bent to the battery can, so as to realize desirable sealing between the battery can and the battery cover.

8 Claims, 2 Drawing Sheets

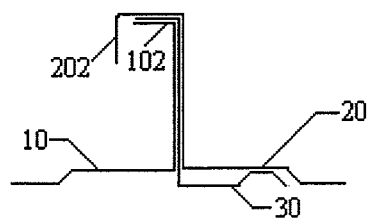
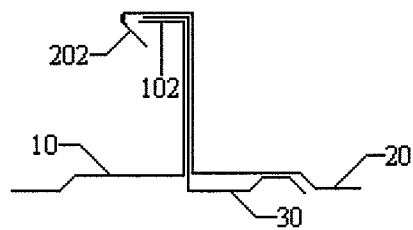
Fig. 1A  Fig. 1B
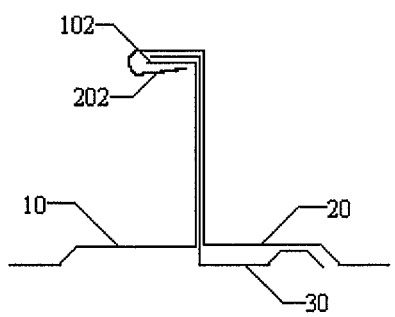
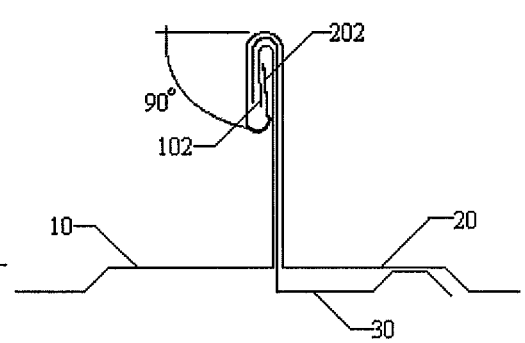
Fig. 1C  Fig. 1D

LITHIUM ION BATTERY

CROSS-REFERENCE TO RELATED APPLICATION

The present patent invention claims priority to Chinese Patent Application No. CN 201020669355.7 filed on Dec. 20, 2010, which is incorporated by reference herein in its entirety.

FIELD OF THE INVENTION

The present invention generally relates to lithium ion batteries and, more particularly, relates to a lithium ion battery which has desirable sealing performance and can be assembled quickly.

BACKGROUND OF THE INVENTION

Recently, with development of science and technology, portable electronic devices, such as video cameras, laptop personal computers, portable DVDs and personal digital assistants are becoming increasingly popular in people's daily life. As a desirable power source for portable electronic devices, lithium ion batteries are widely used due to high energy density, high working voltage and long life span. At present, lithium ion batteries have gradually substituted other traditional batteries and have been widely used in aircrafts, vehicles and medical equipments.

Generally, a lithium ion battery typically includes a battery can, a battery cell received in the battery can, electrolyte filled in the battery can and a battery cover sealing the battery can. In the prior art, the battery cover is typically assembled to the battery can via laser soldering for sealing the same. However, sealing the battery can and the battery cover via laser welding has the following disadvantages. The battery cover cannot be soldered onto the battery can via laser soldering quickly and the production efficiency is undesirable. At the same time, in the laser soldering procedure, defects may be introduced into the soldering area, especially when the battery cover does not tightly contact the battery can or when impurity is introduced at the soldering area, which may adversely affect sealing performance of the lithium ion battery.

What is needed, therefore, is to provide a lithium ion battery which has desirable sealing performance and can be assembled quickly.

SUMMARY OF THE INVENTION

One object of the present invention is to provide a lithium ion battery which has desirable sealing performance and can be assembled quickly.

According to one embodiment of the present invention, a lithium ion battery includes a battery can, a battery cell housed in the battery can, electrolyte filled in the battery can, and a battery cover sealing the battery can. The battery can is formed with a flange portion and the battery cover is formed with a skirt portion corresponding to the flange portion. The skirt portion of the battery cover tightly wraps the flange portion of the battery can, and the skirt portion together with the flange portion wrapped in the skirt portion are tightly wound and bent toward the battery can, so as to provide desirable sealing performance between the battery can and the battery cover.

According to one embodiment of the present invention, the lithium ion battery not only has desirable sealing performance between the battery can and the battery cover, but also can be assembled quickly. Test result shows that, assembling a battery cover to a battery can only needs about 0.08 second.

Preferably, the battery can and the battery cover are made from same material.

Preferably, the battery can and the battery cover are both made from steel or aluminum material.

Preferably, the battery can and the battery cover have round or square cross section.

Preferably, a filling material layer is sandwiched between the flange portion of the battery can and the skirt portion of the battery cover.

Preferably, the filling material layer is made from plastic or rubber which does not react with the electrolyte.

Preferably, the filling material layer is made from fluoroplastic, fluororubber or polypropylene plastic.

Preferably, length of the filling material layer is less than width of the flange portion of the battery can.

Preferably, the filling material layer has a thickness of less than 2 mm.

According to another embodiment of the present invention, a method for assembling a battery cover to a battery can is provided. The method includes the steps of: providing a battery can having a flange portion at an upper side thereof; providing a battery cover having a skirt portion; positioning the skirt portion on the flange portion, with outer edge of the skirt portion extending out of outer edge of the flange portion; bending the skirt portion toward the flange portion so that the skirt portion wrap the flange portion; and winding and bending the skirt portion together with the flange portion wrapped in the skirt portion to the battery can, to realize desirable sealing between the battery can and the battery cover.

Preferably, the battery can and the battery cover are both made from steel or aluminum material.

Preferably, the method further includes a step of providing a filling material layer sandwiched between the flange portion of the battery can and the skirt portion of the battery cover.

Preferably, the filling material layer is made from fluoroplastic, fluororubber or polypropylene plastic which does not react with the electrolyte.

Preferably, length of the filling material layer is less than width of the flange portion of the battery can.

Preferably, the filling material layer has a thickness of less than 2 mm.

Other advantages and novel features will be drawn from the following detailed description of preferred embodiment with the attached drawings, in which:

BRIEF DESCRIPTION OF THE DRAWINGS

FIG. 1A to FIG. 1D depicts an exemplary illustration of sealing a battery can and a battery cover of a lithium ion battery according to one embodiment of the present invention;

DETAILED DESCRIPTION OF THE INVENTION

Figure 2:
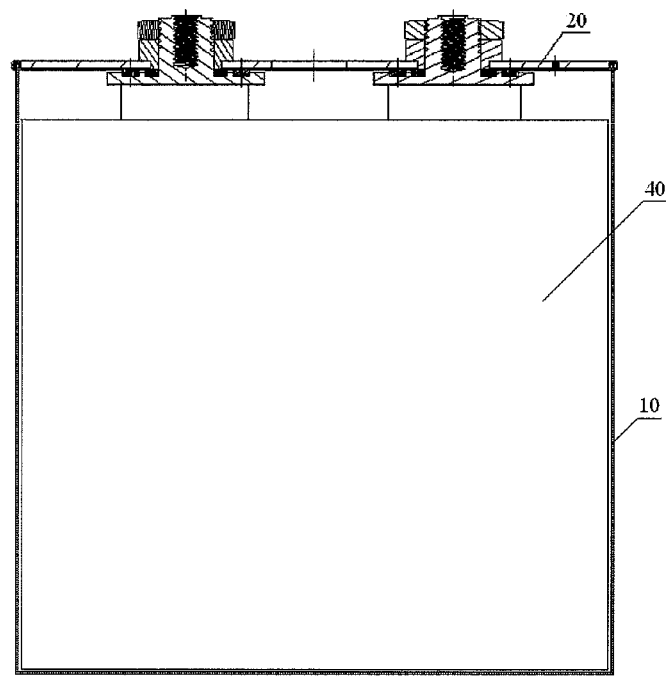
FIG. 2 depicts an exemplary cross sectional view of a assembled lithium ion battery according to the method as shown in FIG. 1A to FIG. 1D.
Figure 3:
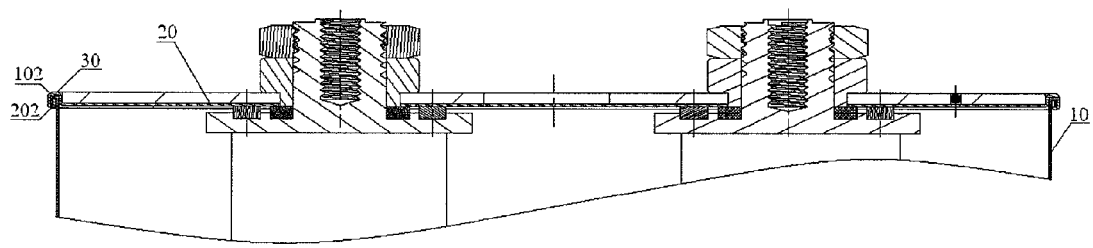
FIG. 3 depicts an enlarged view of an upper section of the lithium ion battery as shown in FIG. 2.

Referring to FIGS. 1 to 3, a lithium ion battery according to one embodiment of the present invention includes a battery can 10, a battery cell 40 received in the battery can 10, electrolyte filled in the battery can 10, and a battery cover 20 sealing the battery can 10.

The battery can 10 is made from aluminum or steel material. The battery can 10 has a round, square or other suitable cross section. In the illustrated embodiment, the battery can 10 is formed with a flange portion 102 which extends out from an upper side of the battery can 10.

The battery cover 20 is made from the same material as that of the battery can 10. According to one embodiment of the present invention, the battery cover 20 is made from aluminum or steel material. The battery cover 20 has a shape and size corresponding to the shape and size of the battery can 10. The battery cover 20 is formed with a skirt portion 202 at a periphery of the battery cover 20, corresponding to the flange portion 102 of the battery can 10. In assembly, when the battery cover 20 is positioned on the battery can 10, the skirt portion 202 can be deformed downwardly to fully wrap the flange portion 102 of the battery can 10.

To improve the sealing performance between the battery can 10 and the battery cover 20, a filling material layer 30 is sandwiched between the battery can 10 and the battery cover 20. The filling material layer 30 has a length less than a width of the flange portion 102 of the battery can 10. The filling material layer 30 has a thickness of less than 2 mm. According to one embodiment of the present invention, the filling material layer 30 is made from material which does not react with the electrolyte and which also has desirable deformability. According to one embodiment of the present invention, the filling material layer 30 is made from plastic or rubber which does not react with the electroltye, such as, polypropylene plastic, fluoroplastic or fluororubber.

Referring to FIG. 1 to FIG. 3, assembly of the lithium ion battery according to embodiment of the present invention will be detailed in detail. It should be noticed that, for the sake of clarity, FIG. 1 only illustrates part of the battery can 10, the battery cover 20 and the filling material layer 30. The method for assembling a lithium ion battery includes the steps of: positioning the battery cell 40 in the battery can 10; filling the electrolyte into the battery can 10; positioning the battery cover 20 on the battery can 10, with the filling material layer 30 sandwiched between the battery cover 20 and the battery can 10; downwardly bending the skirt portion 202 of the battery cover 20 toward the flange portion 102 of the battery can 10, so that the skirt portion 202 can tightly wrap the flange portion 102 of the battery can 10; and tightly winding and bending the flange portion 102 together with the skirt portion 202 wrapping the flange portion 102 to the battery can 10, so that the filling material layer 30 sandwiched between the battery can 10 and the battery cover 20 deforms and fills the space between the battery cover 20 and the battery can 10 and, therefore, achieves desirable sealing performance between the battery can 10 and the battery cover 20.

In view of the foregoing description, the lithium ion battery according to one embodiment of the present invention not only has desirable sealing performance between the battery can 10 and the battery cover 20, but also can be assembled quickly. Test result shows that, assembling a battery cover to a battery can only needs about 0.08 second.

While the present invention has been illustrated by the above description of the preferred embodiment thereof, while the preferred embodiment has been described in considerable detail, it is not intended to restrict or in any way limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A lithium ion battery, comprising:
   a battery can;
   a battery cell received in the battery can;
   electrolyte filled in the battery can; and
   a battery cover sealing the battery can;
   wherein:
   the battery can is formed with a flange portion and the battery cover is formed with a skirt portion corresponding to the flange portion;
   the skirt portion of the battery cover tightly wraps the flange portion of the battery can with a filling material layer that extends along the flange portion and the skirt portion, the filling material being configured to not react with the electrolyte sandwiched between the flange portion and the skirt portion; and
   the skirt portion together with the filling material layer and the flange portion wrapped in the skirt portion are tightly wound and bent toward the battery can to realize desirable sealing between the battery can and the battery cover.

2. The lithium ion battery of claim 1, wherein the battery can and the battery cover are made from same material.

3. The lithium ion battery of claim 1, wherein the battery can and the battery cover are both made from steel or aluminum material.

4. The lithium ion battery of claim 1, wherein the battery can and the battery cover have round or square cross section.

5. The lithium ion battery of claim 1, wherein the filling material layer is made from at least one of a plastic or rubber material that does not react with the electrolyte.

6. The lithium ion battery of claim 1, wherein the filling material layer is made from at least one of polypropylene plastic, fluoroplastic or fluororubber.

7. The lithium ion battery of claim 1, wherein length of the filling material layer is less than width of the flange portion of the battery can.

8. The lithium ion battery of claim 1, wherein the filling material layer has a thickness of less than 2 mm.

* * * * *